(12) United States Patent
Isomura

(10) Patent No.: US 7,630,535 B2
(45) Date of Patent: *Dec. 8, 2009

(54) DIE-TO-DIE PHOTOMASK DEFECT DETECTION USING REGION DATA TO MODIFY INSPECTION THRESHOLDS

(75) Inventor: Ikunao Isomura, Kanagawa (JP)

(73) Assignee: Advanced Mask Inspection Technology Inc., Yokohama-shi (JP)

( * ) Notice: Subject to any disclaimer, the term of this patent is extended or adjusted under 35 U.S.C. 154(b) by 587 days.

This patent is subject to a terminal disclaimer.

(21) Appl. No.: 11/276,426

(22) Filed: Feb. 28, 2006

(65) Prior Publication Data

US 2007/0071307 A1 Mar. 29, 2007

(30) Foreign Application Priority Data

Sep. 26, 2005 (JP) ............................. 2005-278209

(51) Int. Cl.
*G06K 9/00* (2006.01)
(52) U.S. Cl. .................... 382/144; 382/145; 382/149
(58) Field of Classification Search ................ 382/144, 382/145, 149
See application file for complete search history.

(56) References Cited

U.S. PATENT DOCUMENTS

| | | | | |
|---|---|---|---|---|
| 5,404,410 A | * | 4/1995 | Tojo et al. .................... | 382/144 |
| 5,572,598 A | * | 11/1996 | Wihl et al. ................... | 382/144 |
| 6,040,911 A | * | 3/2000 | Nozaki et al. ................ | 356/394 |
| 6,069,971 A | * | 5/2000 | Kanno et al. ................. | 382/144 |
| 6,484,306 B1 | * | 11/2002 | Bokor et al. .................. | 716/21 |
| 2002/0114506 A1 | * | 8/2002 | Hiroi et al. ................... | 382/149 |
| 2003/0137665 A1 | * | 7/2003 | Ando ........................... | 356/394 |
| 2004/0105578 A1 | * | 6/2004 | Tsuchiya et al. ............. | 382/144 |

(Continued)

FOREIGN PATENT DOCUMENTS

JP 11-73501 3/1999

(Continued)

OTHER PUBLICATIONS

Tsuchiya, H., et al. (Apr. 1998) "A gray map reference pattern generator of a die-to-database mask inspection system for 256Mbit and 1Gbit DRAMs." SPIE Conference on Photomask and X-Ray Mask Technology V. SPIE vol. 3412, pp. 544-551.*

(Continued)

*Primary Examiner*—Brian P Werner
*Assistant Examiner*—Barry Drennan
(74) *Attorney, Agent, or Firm*—Oblon, Spivak, McClelland, Maier & Neustadt, P.C.

(57) ABSTRACT

A pattern inspection apparatus which compares a plurality of partial optical image data of a same target plate to be inspected, the target plate being formed as a pattern, includes an optical image data acquiring unit which acquires optical image data of the target plate to be inspected, and a comparing circuit which compares the plurality of partial optical image data. In the comparing circuit, region image data generated based on information of region pattern representing a predetermined region is input, and a decision criterion is changed with reference to the input region image data when the plurality of partial optical image data are compared with each other to decide the presence/absence of a defect on the target plate.

7 Claims, 16 Drawing Sheets

U.S. PATENT DOCUMENTS

2004/0148584 A1 * 7/2004 Tokunaga et al. ............ 716/21

FOREIGN PATENT DOCUMENTS

| JP | 3413110 | 3/2003 |
|---|---|---|
| JP | 2003-215059 | 7/2003 |
| JP | 2004-101654 | 4/2004 |
| JP | 2004-191957 | 7/2004 |
| JP | 2004-317427 | 11/2004 |
| JP | 2005-116768 | 4/2005 |

OTHER PUBLICATIONS

Japanese Patent Office (Jan. 21, 2009), Decision of Rejection for application JP 2005-278209.*
Japanese Patent Office (Oct. 22, 2008), Notification of Reasons for Refusal for application JP 2005-278209.*
U.S. Appl. No. 11/284,186, filed Nov. 22, 2005, Isomura.

* cited by examiner

Basic Pattern (1), OPC Pattern, Region Pattern, Basic Pattern (2)

Basic Pattern Optical Image (1), OPC Pattern (Design Pattern), OPC Pattern (Optical Image), Region Image, Basic Pattern Optical Image (2)

Optical Image Data

Measurement Pixel

Region Image Data

Region Pixel (Corresponding to 2 × 2 Pixel)

DIE-TO-DIE PHOTOMASK DEFECT DETECTION USING REGION DATA TO MODIFY INSPECTION THRESHOLDS

CROSS-REFERENCE TO RELATED ART

This application is based on and claims priority of Japanese Patent Application (JPA) No. 2005-278209, filed on Sep. 26, 2005, the entire contents of which are incorporated herein by reference.

BACKGROUND OF THE INVENTION

1. Field of the Invention

The present invention relates to a pattern inspection apparatus, a pattern inspection method, or a program which causes a computer to execute the method, such as a pattern inspection technique which inspects a pattern defect of an object used in manufacturing a semiconductor, and an apparatus which inspects a defect of a considerably small pattern of a photomask, a wafer, or a liquid crystal substrate used in manufacturing a semiconductor device or a liquid crystal display (LCD).

2. Related Art

In recent years, with a high integration density and a large capacity of a large-scale integrated circuit (LSI), a circuit line width required for semiconductor devices has increasingly been narrowed. These semiconductor devices are manufactured such that a pattern is exposed and transferred on a wafer by a reduced projection exposure device called a stepper while using an original pattern with a circuit pattern formed thereupon (The original pattern is also called a mask or a reticle. The original pattern will be generally called as a mask hereinafter.) to form a circuit. Therefore, in manufacturing a mask to transfer the fine circuit pattern on a wafer, a pattern drawing device which can draw a fine circuit pattern is utilized.

An improvement in yield is essential in manufacturing an LSI which requires a lot of manufacturing cost. However, as represented by a 1-gigabit DRAM (Dynamic Random Access Memory), the order of a pattern constituting an LSI has been changing from a sub-micron order to a nano order. As one serious factor which decreases a yield, a pattern defect of a mask used when an ultrafine pattern is exposed and transferred on a semiconductor wafer by a photolithography technique is known. In recent years, with a miniaturization of an LSI pattern formed on a semiconductor wafer, a size which must be detected as a pattern defect has also become considerably small. For this reason, a pattern inspection apparatus which inspects a defect of a transfer mask used in manufacturing an LSI must be increased in precision.

On the other hand, with development of multimedia, an LCD (Liquid Crystal Display) has a liquid crystal substrate size of a 500 mm×600 mm or larger, and micropatterning of a TFT (Thin Film Transistor) or the like formed on a liquid crystal substrate advances. Therefore, it is required that a considerably small pattern defect be inspected in a large area. For this reason, development of a pattern inspection apparatus which efficiently inspects a defect of a pattern of a large-area LCD and a photomask used in manufacturing the large-area LCD in a short period of time is urgently required.

In this case, in a conventional pattern inspection apparatus, it is known that image data obtained by picking up an image of a pattern formed on a target plate such as a lithography mask or the like at a predetermined magnification by using a magnifying optical system is compared with design data or an image data obtained by picking up the image of the same pattern on the target plate to perform inspection.

For example, as pattern inspection methods, "die-to-die inspection" which compares image data obtained by picking up images of the same patterns at different places on the same mask and "die-to-database inspection" which generates design image data based on drawing data obtained by converting CAD data used in drawing a mask pattern into data in an inspection apparatus input format and compares the design image data with image data serving as measurement data obtained by picking up the image of a pattern are known. In the inspection methods in the inspection apparatus, a target plate is placed on a stage, and a flux of light scans the target plate as a result of the movement of the stage to perform inspection. The flux of light is irradiated on the target plate from a light source and an illumination optical system. Light transmitted through the target plate or reflected by the target plate is focused on a sensor through an optical system. The image picked by the sensor is transmitted to a comparing circuit as image data. In the comparing circuit, after alignment of the images, the image data, which has been picked up, is compared with the other image data or with design image data based on an appropriate algorithm. When the measurement data is different from the reference data, it is determined that a pattern defect is present.

An example of an algorithm of pattern inspection will be described below based on the case of "die-to-die inspection."

When a target plate to be inspected is scanned, a sensor which scans a target plate observes a pattern in a region having a certain area. The region has a portion having a pattern and a portion having no pattern. As a result, from the sensor, grayscale data corresponding to a ratio of the pattern-present portion to the pattern-absent portion (occupation rate) is output in consideration of the optical characteristics or the like of the device. Two regions are compared with each other by comparing two image data output from the regions. When the data (occupation rates or grayscale values) are same with each other, it is determined that the patterns are same with each other. When the image data are different from each other, it is determined that the patterns are not same with each other. In general the image data is described as 8-bit pixel data and corresponds to 256 grayscales. For this reason, unless the image data are completely equal to each other, it is strict that a pattern defect is included in any one of both the patterns. However, in consideration of actual mask precision or the like, it is not practical that a pattern defect is included in any one of both the patterns. For this reason, in consideration of a difference between the comparison data, sameness or difference of the pattern is generally determined.

At this time, the degree of difference between the comparison data when the patterns are determined as the same patterns is called a threshold value. The threshold value is arbitrarily determined depending on various parameters of the inspecting apparatus.

In recent years, the line width of a design pattern has been narrowed, the presence of a micropattern for optical proximity correction (OPC) makes it difficult to match a design pattern and output data of measurement or output data of measurement when the images of same patterns at different positions on the same mask are picked, and objects which are not desired to be essentially determined as defects are occasionally seen as defects (pseudo defects). However, if the decision threshold value is moderated, a defect in a pattern which requires a high dimensional accuracy cannot be detected. For this reason, a drawn pattern is required to be compared and inspected at a plurality of inspection accuracies.

A technique which classifies drawn patterns in a plurality of ranks and compares and inspects the drawn patterns is disclosed in documents (for example, see Japanese Patent Application, Publication No. 2004-191957). However, in the patent document, a method of embodying a manner of classifying drawn patterns into a plurality of ranks in an apparatus is not concretely described. The technique is not sufficient in terms of usefulness, and a method of solving the problem is desired. Furthermore, a method of automatically detecting an OPC pattern from design image data (image data) to reduce pseudo defects in number is proposed (for example, see Japanese Patent No. 34131110).

When a defect appears in a target plate, a user generally reviews the defect. However, a considerably larger number of micropatterns and the like for the above optical proximity correction (OPC) are arranged (for example, at several ten thousands). For this reason, if all the micropatterns are determined as defects, quantity of work and time required to review the defects by a user exceed their limitations. As described above, when a large number of pseudo defects appear in the target plate, the inspection itself must be disadvantageously performed again. Alternatively, an expensive target plate itself must be disadvantageously manufactured again. In contrast to this, there is a problem that a defect in a pattern which requires a high dimensional accuracy cannot be detected if a decision threshold value is moderated.

SUMMARY OF THE INVENTION

The present invention is to overcome the above problems and has as its object to provide an apparatus, a method, and a program which can perform pattern inspection at an appropriate accuracy.

A pattern inspection apparatus, which compares a plurality of partial optical image data of a same target plate to be inspected, the target plate being formed as a pattern, according to an embodiment of the present invention comprises: an optical image data acquiring unit which acquires optical image data of the target plate to be inspected; and a comparing unit which receives region image data generated based on information of a region pattern representing a predetermined region of the target plate to be inspected, changes a decision criterion with reference to the region image data, and compares the plurality of partial optical image data.

A pattern inspection apparatus, which compares a plurality of partial optical image data of a same target plate to be inspected, the target plate being formed as a pattern, according to an embodiment of the present invention comprises: an optical image data acquiring unit which acquires optical image data of the target plate to be inspected; and a comparing unit which receives region image data generated based on information of a region pattern representing a predetermined region of the target plate to be inspected, changes a decision criterion with reference to the region image data when a predetermined decision criterion is not satisfied as a result of comparison between the plurality of partial optical image data, and compares the plurality of partial optical image data again.

A pattern inspection method, which compares a plurality of partial optical image data of a same target plate to be inspected, the target plate being formed as a pattern, according to an embodiment of the present invention comprises: acquiring optical image data of the target plate to be inspected; and receiving region image data generated based on information of a region pattern representing a predetermined region of the target plate to be inspected, changing a decision criterion with reference to the region image data, and comparing the plurality of partial optical image data.

A pattern inspection method, which compares a plurality of partial optical image data of a same target plate to be inspected, the target plate being formed as a pattern, according to an embodiment of the present invention comprises: acquiring optical image data of the target plate to be inspected; and receiving region image data generated based on information of a region pattern representing a predetermined region of the target plate to be inspected, changing a decision criterion with reference to the region image data when a predetermined decision criterion is not satisfied as a result of comparison between the plurality of partial optical image data, and comparing the plurality of partial optical image data again.

A program, which causes a computer to execute comparison between a plurality of partial optical image data of a same target plate to be inspected, the target plate being formed as a pattern, according to an embodiment of the present invention causes the computer to execute: an optical image data acquiring process which acquires optical image data of the target plate to be inspected; and a comparing process which receives region image data generated based on information of a region pattern representing a predetermined region of the target plate to be inspected, changes a decision criterion with reference to the region image data, and compares the plurality of partial optical image data.

A program, which causes a computer to execute comparison between a plurality of partial optical image data of a same target plate to be inspected, the target plate being formed as a pattern, according to an embodiment of the present invention causes the computer to execute: an optical image data acquiring process which acquires optical image data of the target plate to be inspected; and a comparing process which receives region image data generated based on information of a region pattern representing a predetermined region of the target plate to be inspected, changes a decision criterion with reference to the region image data when a predetermined decision criterion is not satisfied as a result of comparison between the plurality of partial optical image data, and compares the plurality of partial optical image data again.

According to the present invention, pseudo defects which are determined in a conventional technique can be reduced, and effective use of an apparatus becomes possible as, for example, repetition of inspection can be avoided. Furthermore, a defect detecting accuracy in a pattern which requires a high accuracy can be improved.

DETAILED DESCRIPTION OF THE INVENTION

Terms used in the present invention will be briefly described below.

Optical image data is an integral of measurement pixel data of a pattern of a target plate to be inspected, the measurement pixel data being obtained by inspection performed by an inspecting apparatus.

The measurement pixel data is data held by a measurement pixel which is grid using one pixel of a sensor as a unit, and is also a unit of optical image data. For example, the data is 8-bit unsigned data which expresses grayscales (256 grayscales in case of 8 bits) of brightness of each measurement pixel.

The optical image is a two-dimensional graphic pattern corresponding to a part or a whole of optical image data.

Partial optical image data is a part of optical image data corresponding to patterns to be compared with each other because the patterns are same patterns at different positions on the same mask in case of die-to-die inspection. For example, when a plurality of same pattern dies are formed on a mask, an integral of measurement pixel data of one of the dies is called a partial optical image data. The partial optical image data may be an integral of measurement pixel data in a range corresponding to a repeated pattern on the same die.

The design pattern is a two-dimensional graphic pattern expressing a mask pattern. The design pattern is also used when not only each pattern is expressed but also all two-dimensional graphic patterns on the mask are integrally expressed.

The information of a design pattern is data obtained by describing a design pattern in a predetermined format except for the format of image data. For example, the data format corresponds to a drawing data format for a drawing device.

The region pattern is a two-dimensional graphic pattern showing a predetermined region of a target plate to be inspected to give decision criterion changing information at the time of comparison of partial optical image data. The region pattern is used when not only each pattern is expressed but also all two-dimensional graphic patterns on a mask are integrally expressed.

The information of a region pattern is data obtained by describing the region pattern in a predetermined format except for the format of image data.

The region image data is an integral of binary or multivalued region pixel data generated from the information of the region pattern.

The region pixel data is data held by a region pixel serving as a grid having a predetermined quantization size as a unit. The region pixel data is a unit of region image data. Decision criterion changing information is expressed by binary or multivalued bit data.

The region image is a two-dimensional graphic pattern expressing a pixel region which is derived from a predetermined region pattern and changes an inspection decision criterion.

First Embodiment

Figure 1:
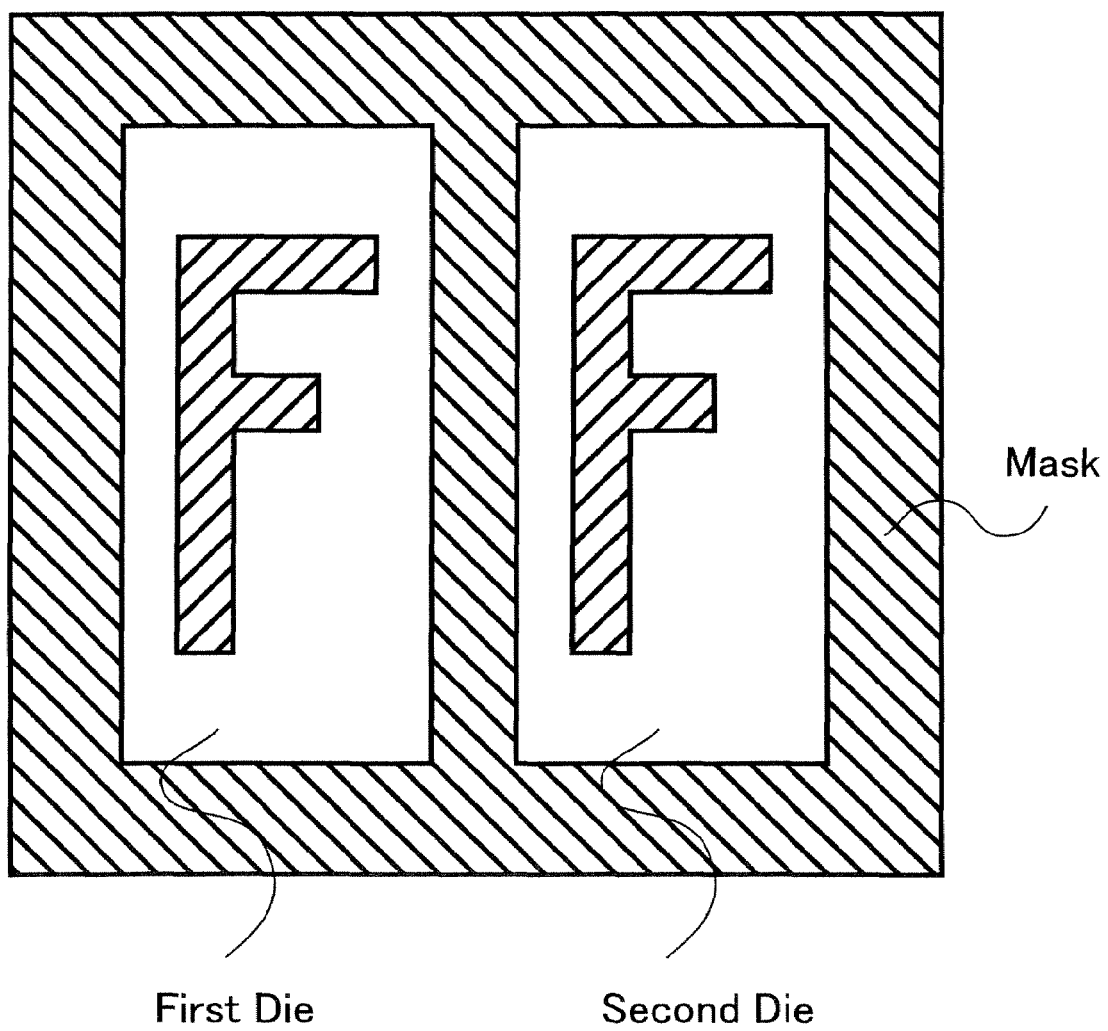
FIG. 1 is a diagram showing a mask serving as a target plate to be inspected in a first embodiment.

FIG. 1 shows a mask serving as a target plate to be inspected in a first embodiment. Two dies having same patterns are drawn on the mask. In the present embodiment, the dies on the mask are called first and second dies. Partial optical images of corresponding patterns that are supposed to be formed with no differences are inspected for the presence/absence of a defect on the mask.

Figure 2:
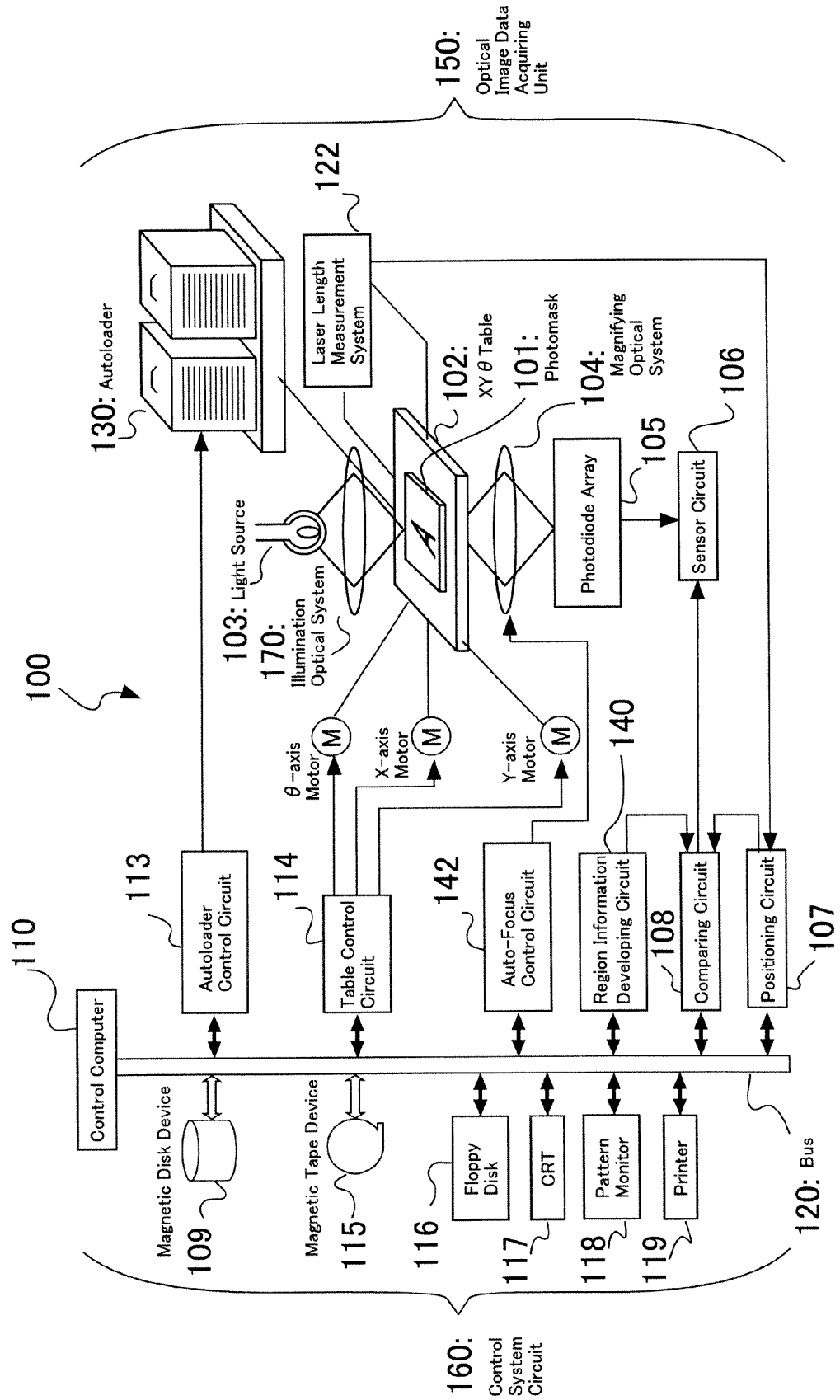
FIG. 2 is a conceptual diagram showing the configuration of a pattern inspection apparatus according to the first embodiment.

FIG. 2 is a conceptual diagram showing the configuration of a pattern inspection apparatus according to the first embodiment.

In FIG. 2, the pattern inspection apparatus 100, which inspects a defect of a target plate which is a substrate such as a mask or a wafer, includes an optical image data acquiring unit 150 and a control system circuit 160. The optical image data acquiring unit 150 includes an XYθ table 102, a light source 103, a magnifying optical system 104, a photodiode array 105, a sensor circuit 106, a laser length measurement system 122, an autoloader 130, and an illumination optical system 170. In the control system circuit 160, a control computer 110 serving as a computer is connected, through a bus 120 serving as a data transmitting path, a positioning circuit 107, a comparing circuit 108 serving as an example of a comparator, a region information developing circuit 140 serving as an example of a region image data generating unit, an autoloader control circuit 113, a table control circuit 114, an auto-focus control circuit 142, a magnetic disk device 109 serving as an example of storing device, a magnetic tape device 115, a floppy (trade name) disk 116, a CRT 117, a pattern monitor 118, and a printer 119. The XYθ table 102 is driven by an X-axis motor, a Y-axis motor, and a θ-axis monitor. In FIG. 2, units except for constituent units necessary for explaining the first embodiment are not shown. The pattern inspection apparatus 100 generally includes other necessary constituent elements as a matter of course.

Figure 3:
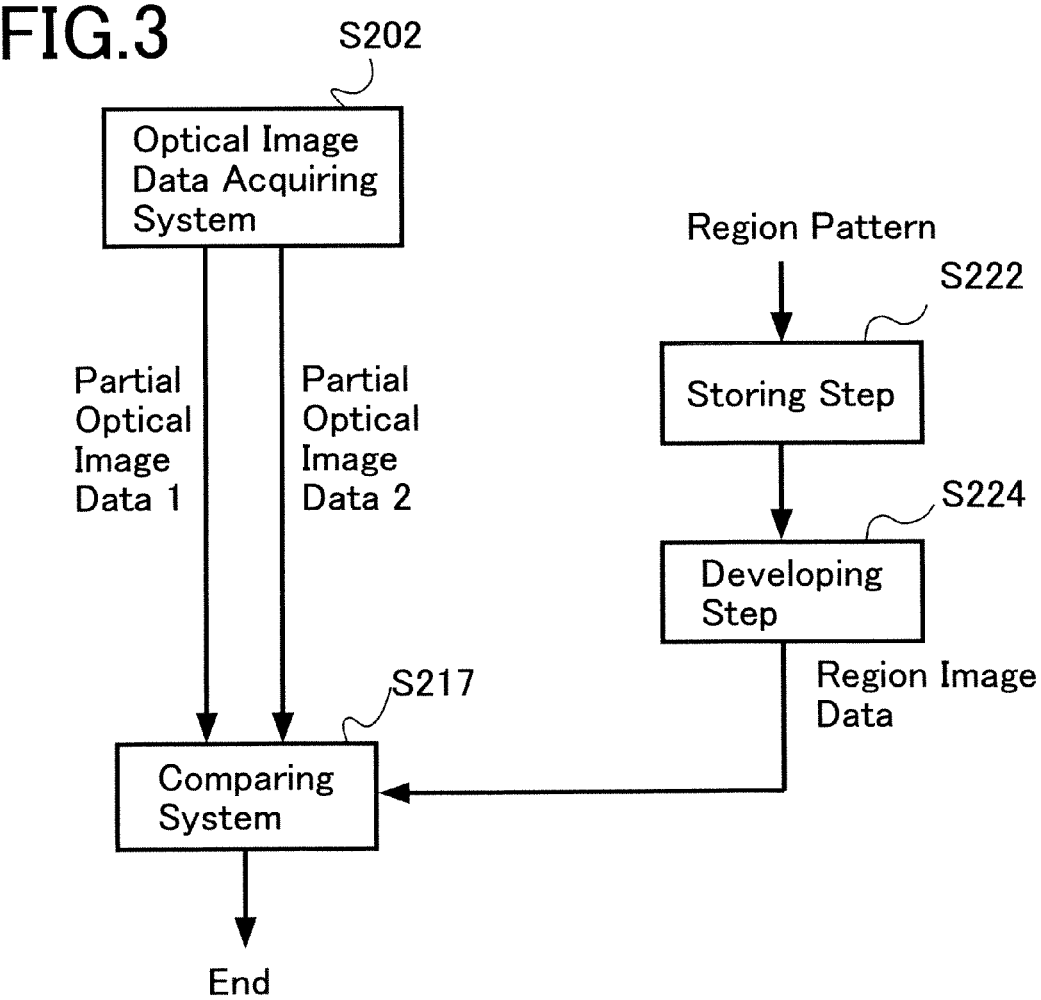
FIG. 3 is a flow chart showing main steps of an example of a pattern inspection method according to the first embodiment.

FIG. 3 is a flow chart showing main steps of a pattern inspection method according to the first embodiment.

In FIG. 3, the pattern inspection method executes a series of steps, i.e., an optical image data acquiring step (S202); a region pattern storing step (S222); a developing step (S224) serving as an example of the region image data generating step, and, a comparing step (S217) of comparing partial optical image data 1 corresponding to a first die and partial optical image data 2 serving as a second die.

In S (step) 202, as the optical image acquiring step, the optical image acquiring unit 150 shown in FIG. 2 acquires an optical image data on a photomask 101 serving as a target plate. More specifically, the optical image is acquired as follows.

The photomask 101 serving as a target plate to be inspected is placed on the XYθ table 102 which is arranged such that the XYθ table 102 can be moved in a horizontal direction and a rotating direction by the X-, Y-, and θ-axis motors. On the pattern formed on the photomask 101, light is irradiated by the appropriate light source 103 arranged above the XYθ table 102. A flux of light irradiated from the light source 103 is irradiated on the photomask 101 serving as a target plate through the illumination optical system 170. Below the photomask 101, the magnifying optical system 104, the photodiode array 105, and the sensor circuit 106 are arranged. The light transmitted through the photomask 101 serving as a target plate is focused on the photodiode array 105 as an optical image through the magnifying optical system 104 and enters the photodiode array 105. Focal point adjustment of the magnifying optical system 104 is automatically performed, for example, by the auto-focus control circuit 142.

Figure 4:
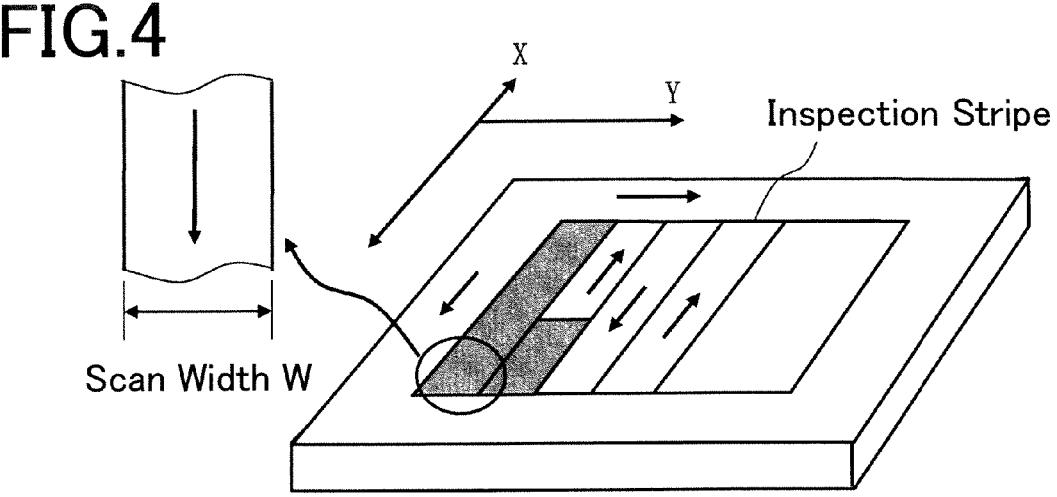
FIG. 4 is a diagram for explaining a procedure of acquiring an optical image.

FIG. 4 is a diagram for explaining a procedure for acquiring an optical image.

A region to be inspected is, as shown in FIG. 4, virtually divided into a plurality of strip-like inspection stripes each having a scan width W in a Y direction, and the operation of the XYθ table 102 (FIG. 2) is controlled such that the divided inspection stripes are continuously scanned. While the XYθ table 102 moves in the X direction, an optical image is acquired. In the photodiode array 105 (FIG. 2), images each having a scan width W as shown in FIG. 4 are continuously input. After an image on a first inspection stripe is acquired, images each having the scan width W are continuously input while an image on a second inspection stripe is moved in the reverse direction at this time. When an image on a third inspection stripe is to be acquired, the image is acquired while the image is moved in the direction reverse to the direction for acquiring the image on the second inspection stripe, i.e., the direction for acquiring the image on the first inspection stripe. In this manner, the images are continuously acquired to make it possible to shorten wasteful processing time.

In FIG. 2, the image of the pattern focused on the photodiode array 105 is photo-electrically converted by the photodiode array 105. Furthermore, the electric image is A/D-converted (analog-digital-converted) by the sensor circuit 106. In the photodiode array 105, a sensor such as a TDI (Time Delay Integrator) sensor is arranged. The XYθ table 102 serving as a stage is continuously moved in the X-axis direction to cause the TDI sensor to pick up the image of the pattern of the photomask 101 serving as a target plate. An inspection optical system having a large magnification is constituted by the light source 103, the magnifying optical system 104, the photodiode array 105, and the sensor circuit 106.

The XYθ table 102 is driven by the table control circuit 114 under the control of the control calculator 110. The XYθ table 102 can be moved by a drive system such as 3-axis (X-Y-θ) motors which drive the XYθ table 102 in the X direction, the Y direction, and the θ direction. As these X motor, Y motor, and θ motor, for example, step motors can be used. A moving position of the XYθ table 102 is measured by the laser length measurement system 122 and supplied to the positioning circuit 107. The photomask 101 on the XYθ table 102 is automatically carried from the autoloader 130 driven by the autoloader control circuit 113 and automatically discharged upon completion of the inspection.

Measurement pixel data output from the sensor circuit 106 is transmitted to the comparing circuit 108 together with data output from the positioning circuit 107 and representing the position of the photomask 101 on the XYθ table 102. The measurement data is, for example, 8-bit unsigned data, and expresses grayscales (if 8-bit, 256 grayscale) of brightness of respective pixels.

Figure 6:
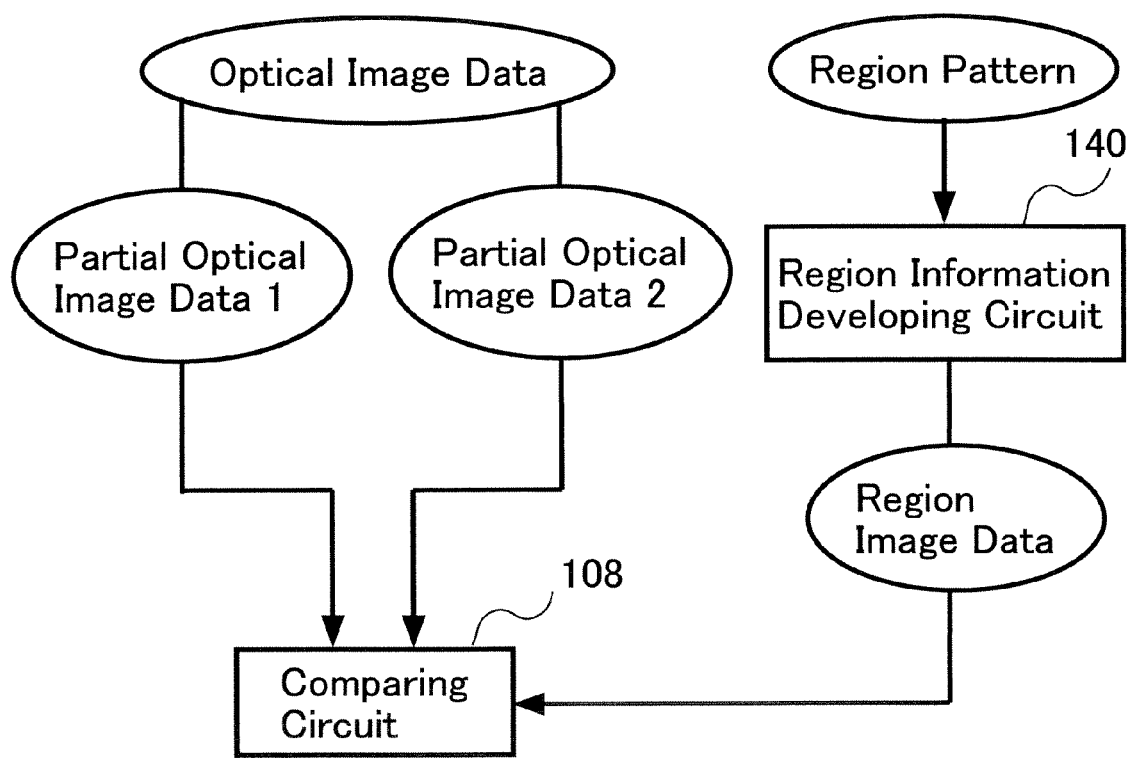
FIG. 6 is a block diagram of a circuit configuration according to the flow chart of the main steps in the pattern inspection method.

In step S217 in FIG. 3, as a comparing step, the comparing circuit 108 in FIGS. 2 and 6 compares, among measurement pixel data generated by the sensor circuit 106 based on a transparent image, a reflected image, and the like obtained from the photo mask 101 serving as a target plate, measurement pixel data belonging to the partial optical image data 1 corresponding to the first die of a pattern to be inspected with measurement pixel data belonging to the partial optical image data 2 corresponding to the second die according to a predetermined algorithm to decide the presence/absence of a defect.

Without modification, a pseudo defect may be generated as described above. Therefore, in the first embodiment, region image data is generated by using the region information developing circuit 140 shown in FIG. 2. As described above, with micropatterning in recent years, it has become difficult to match partial optical image data obtained by picking up images of same patterns at different positions on the same mask so as not to generate a pseudo defect. This is considerably dependent on difficulty of uniformly drawing a pattern on the entire surface of a target plate or on local formation of a complex pattern. Therefore, in the first embodiment, in "die-to-die inspection" which compares partial optical image data obtained by different dies on the same mask with each other, a comparing process system which makes an inspection threshold value variable by using region image data to make it possible to suppress a pseudo defect is constructed.

FIG. 6 is a block diagram of a circuit configuration according to a flow chart of main steps in a pattern inspection method.

In FIG. 6, the partial optical image data 1 corresponding to the first die and the partial optical image data 2 corresponding to the second die, the partial optical image data 1 and the partial optical image data 2 being extracted from optical image data and compared with each other, are transmitted to the comparing circuit 108 as described above. The information of the region pattern is converted into region image data by the region information developing circuit 140, and the region image data is transmitted to the comparing circuit 108.

Hereinbelow, description is made on generation of the region image data with reference to FIGS. 2, 3, and 5.

In step S222 in FIG. 3, as the storing step, the information of a region pattern is stored in the magnetic disk device 109 (FIG. 2) serving as an example of a storing device (memory).

In step S224 in FIG. 3, as the developing step, the region information developing circuit 140 in FIG. 2 reads out the information of the region pattern from the magnetic disk device 109 through the control computer 110 and converts the read information of the region pattern into binary or multi-valued image data (region image data).

Figure 5:
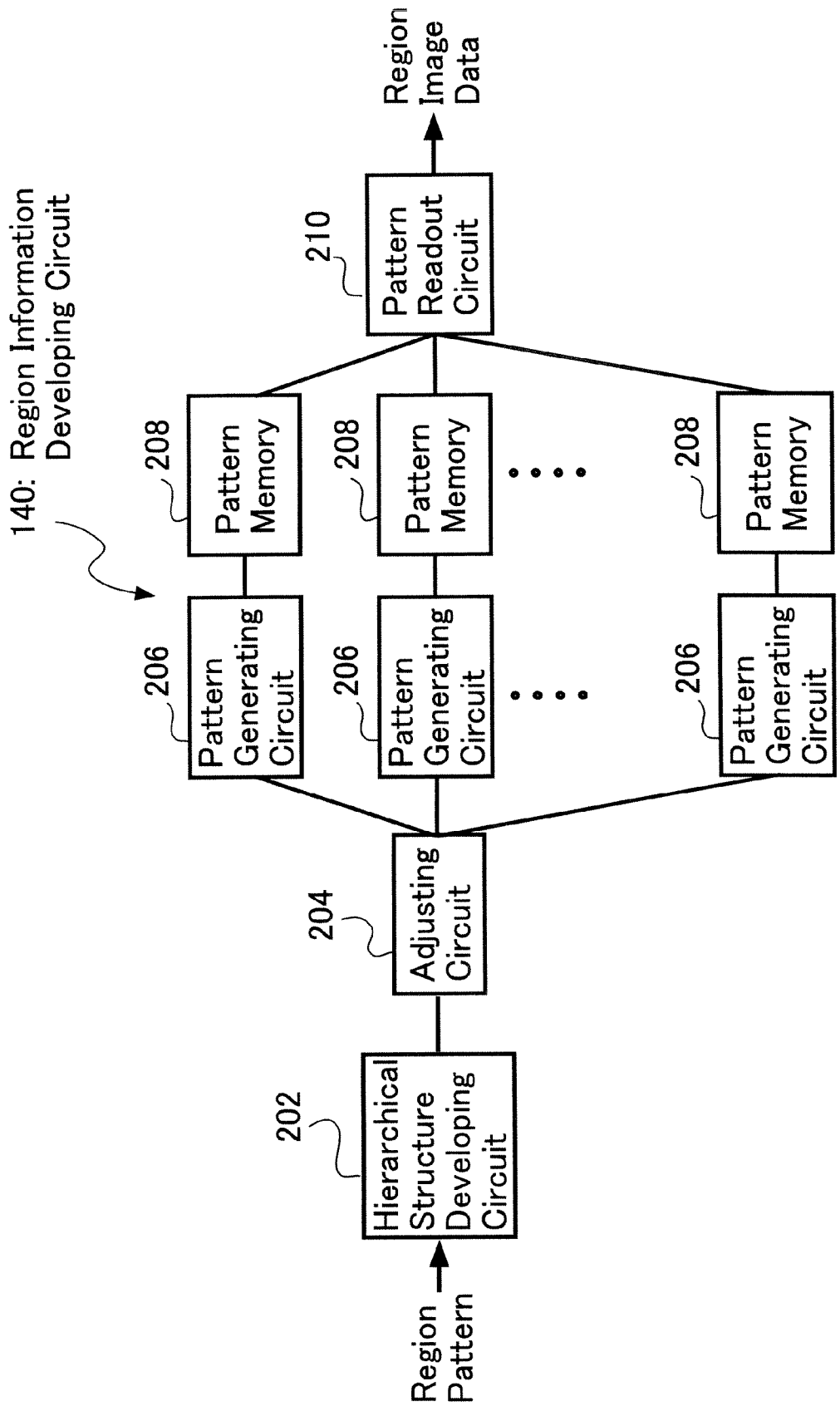
FIG. 5 is a diagram showing an example of the configuration of a region information developing circuit.

FIG. 5 is a diagram showing an example of the configuration of a region information developing circuit.

In FIG. 5, the region information developing circuit 140 has a hierarchical structure developing circuit 202, an adjusting circuit 204, a pattern generating circuit 206, a pattern memory 208, and a pattern readout circuit 210. The pattern generating circuit 206 and the pattern memory 208 constitute one pair in a plurality of stages.

In this case, for example, graphics included in the information of the region patterns include rectangles and triangles as basic graphics. For example, graphic data which defines the shapes, sizes, positions, and the like of pattern graphics by information including coordinates (x,y) at reference positions of the graphics, lengths of sides, and graphic codes serving as identifiers which discriminate graphic types such as a rectangle and a triangle from each other are stored.

When the information of the region pattern serving as the graphic data is input to the region information developing circuit 140, the hierarchical structure developing circuit 202 develops the information into data of each graphic and interprets the graphic code representing a graphic shape of the graphic data, a graphic size, and the like. In the pattern generating circuit 206, as a pattern arranged in a grid (region pixel) serving as a unit having a predetermined quantization size, binary or multivalued data is developed. The developed data is temporarily accumulated in the pattern memory 208. In other words, in the pattern generating circuit 206 serving as an example of an occupation rate calculating unit, the information of the region pattern is loaded, an occupation rate of the graphic in the information of the region pattern in each grid obtained by virtually dividing the inspection region in units of predetermined sizes, and n-bit occupation-rate data is output to the pattern memory 208. For example, one grid is preferably set as one pixel. It is assumed that one pixel has a resolution of $1/2^8$ (=$1/256$). In this case, $1/256$ small regions are allocated to the region of the graphics arranged in a pixel to calculate an occupation rate in the pixel. The occupation rate is output to the pattern memory 208 as 8-bit occupation-rate data. As will be described later, the occupation-rate data serves as basic data for generation of region pixel data.

A format of the information of a region pattern input to the region information developing circuit 140 is not specially restricted.

However, if the format is made common with that of the information of a design pattern used as drawing data of a mask serving as a target plate to be inspected, the efficiency can be improved because a tool which outputs the design pattern can be directly used.

In order to cause the plurality of pattern generating circuits 206 to efficiently perform a parallel processing operation, the adjusting circuit 204 distributes input data to the respective pattern generating circuits 206. The pattern readout circuit 210 reads the occupation rate data stored in the pattern memories 208. In the pattern readout circuit 210, when occupation-rate data is present in the same pixel, the occupation data is added to the read data and read. In this manner, a graphic occupation rate (grayscale value) in each pixel is known.

The read graphic occupation-rate data in each pixel is converted into region image data having inspection threshold value sensitivity information according to a predetermined algorithm.

More specifically, for example, in an algorithm which gives information for changing an inspection threshold value to a region pixel having an occupation rate equal to or larger than a regulated value, a method of setting "1" to a region pixel which satisfies the condition and setting "0" to a region pixel which does not satisfy the condition is used to obtain binary (1-bit) inspection threshold value changing information. The inspection threshold value changing information is used as region pixel data serving as a unit of region image data used in the comparing step.

In step S217 in FIG. 3, as the comparing step, region image data is constantly loaded, and the partial optical image data 1 corresponding to the first die and the partial optical image data 2 corresponding to the second die are compared with each other to decide the presence/absence of a defect according to a predetermined algorithm. More specifically, for example, when an occupation rate (grayscale value) of measurement pixel data of the first die is compared with an occupation rate (grayscale value) of measurement pixel data of the corresponding second die to decide the presence/absence of a defect based on a difference between the occupation rates (grayscale values) of the two measurement pixel data, a threshold value to be applied is determined with reference to the inspection threshold value information held by the region pixel of corresponding region image data. The threshold value is compared with the difference between the occupation rates of the two measurement pixel data to decide the presence/absence of a defect.

In this case, to align partial optical image data of different dies to each other, by using a specific or arbitrary pattern image which is present on a target plate, the relative distances of the partial optical image data are aligned to each other. However, in the present embodiment, in addition to the above alignment, the origins of the region image data are necessarily aligned to the origin on the target plate. For this purpose, in a conventional technique, as performed in a "die-to-database inspections" apparatus which compares design image data with optical image data, alignment may be executed by using such a pattern that the origin on the target plate can be specified.

Figure 7:
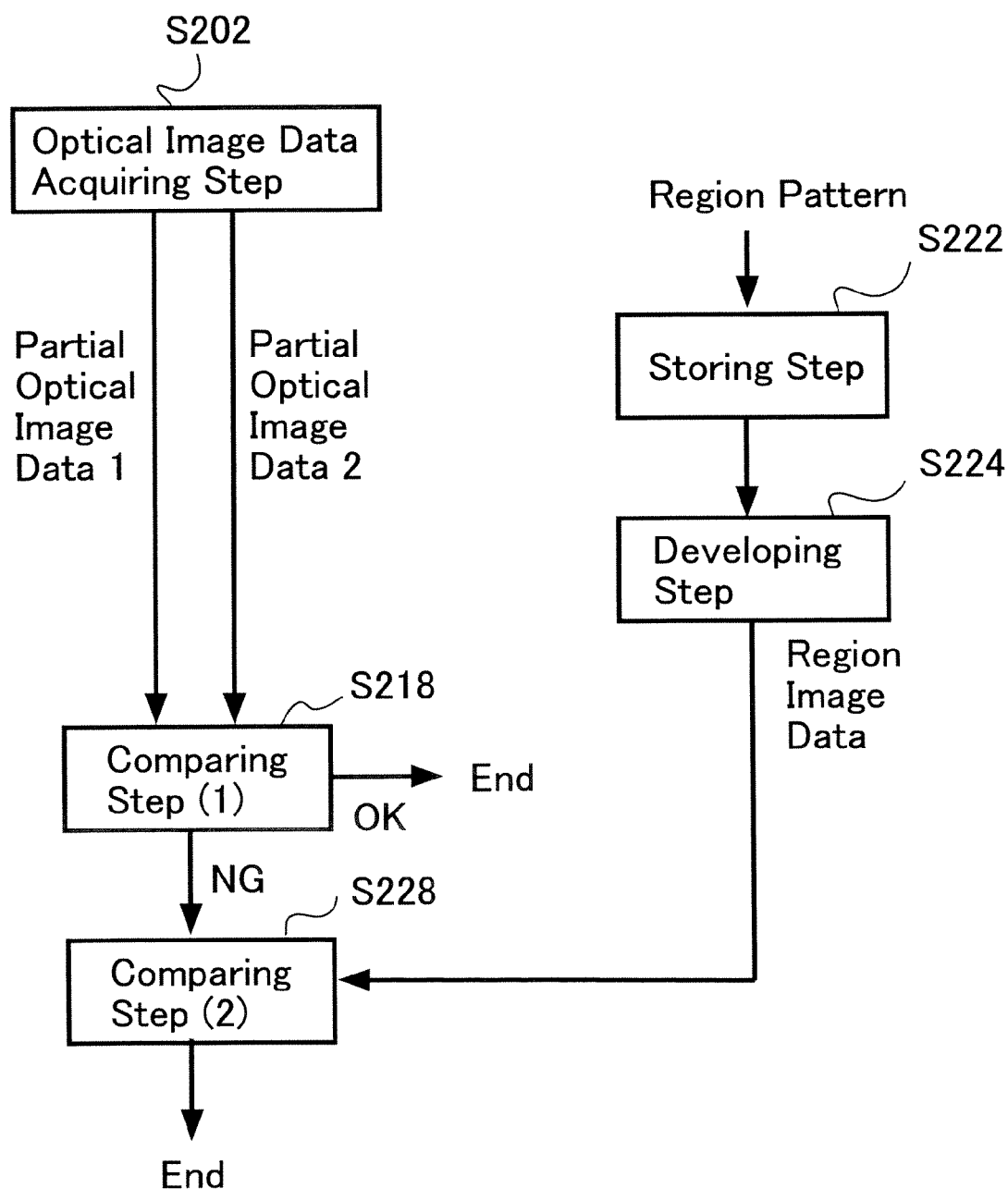
FIG. 7 is a flow chart showing main steps of an example of the pattern inspection method according to the first embodiment.

In the comparing step, as shown in FIG. 3, the partial optical image data 1 and the partial optical image data 2 may be compared with each other while constantly changing an inspection threshold value (inspection sensitivity) based on region image data. Furthermore, as shown in FIG. 7, when a defective portion (NG) detected in comparison between the partial optical image data in step S218 serving as the comparing step (1) is generated, an inspection threshold value (inspection sensitivity) serving as a decision criterion is changed based on the region image data to compare the partial optical image data with each other again in step S228 serving as the comparing step (2). This method is more preferable in consideration of time required for the comparing process.

With the above configuration, the comparing circuit 108 (FIGS. 2 and 6) performs a defect decision while changing a comparison decision threshold value of regions to be compared by region image data. Therefore, a region to which a defective decision must be severely performed can be inspected at a severe decision threshold value, and a region which is not considerably important can be prevented from being inspected at an unnecessarily severe decision threshold value. As a result, a large number of pseudo defects can be prevented from being generated.

As region image data serving as inspection threshold value (sensitivity) information, information constituted by the format same as that of the optical image data, or, in other words, by a binary or multivalued data format serving as a pattern arranged in a grid having a predetermined quantization size as a unit is used to directly divert a comparing circuit and a comparing process of an existing apparatus. An inspecting apparatus achieving high efficiency and a high inspection accuracy can be realized.

A pattern in which a pseudo defect is easily generated when the partial optical image data are compared with each other and inspected will be described below.

Figure 8:
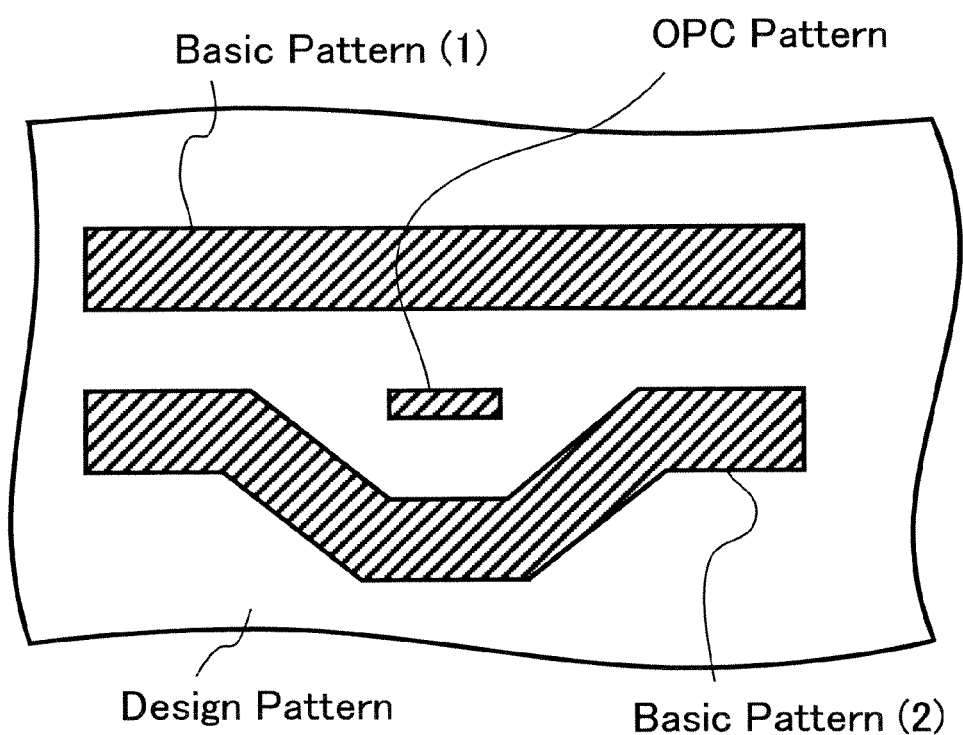
FIG. 8 is a diagram showing an example of a design pattern in which an OPC pattern is arranged.

FIG. 8 is a diagram showing an example of a design pattern in which an OPC pattern is arranged.

In FIG. 8, as design patterns, two adjacent line patterns are formed as basic patterns. As one basic pattern (1), a straight line pattern is formed. As the other basic pattern (2), a pattern is formed such that a trace is externally bent once without being changed in line width and returns to the original position. When the mask pattern having local space movement is transferred on a wafer without being changed, the spaces and the lines to be transferred are locally diverged from a predetermined design value because of the influence of proximity effect. Therefore, in order to transfer such a pattern on a wafer at a predetermined design value, an OPC pattern serving as an assist pattern having a line width smaller than that of the basic pattern is arranged in a space portion having a space (distance) between the line patterns.

Figure 9:
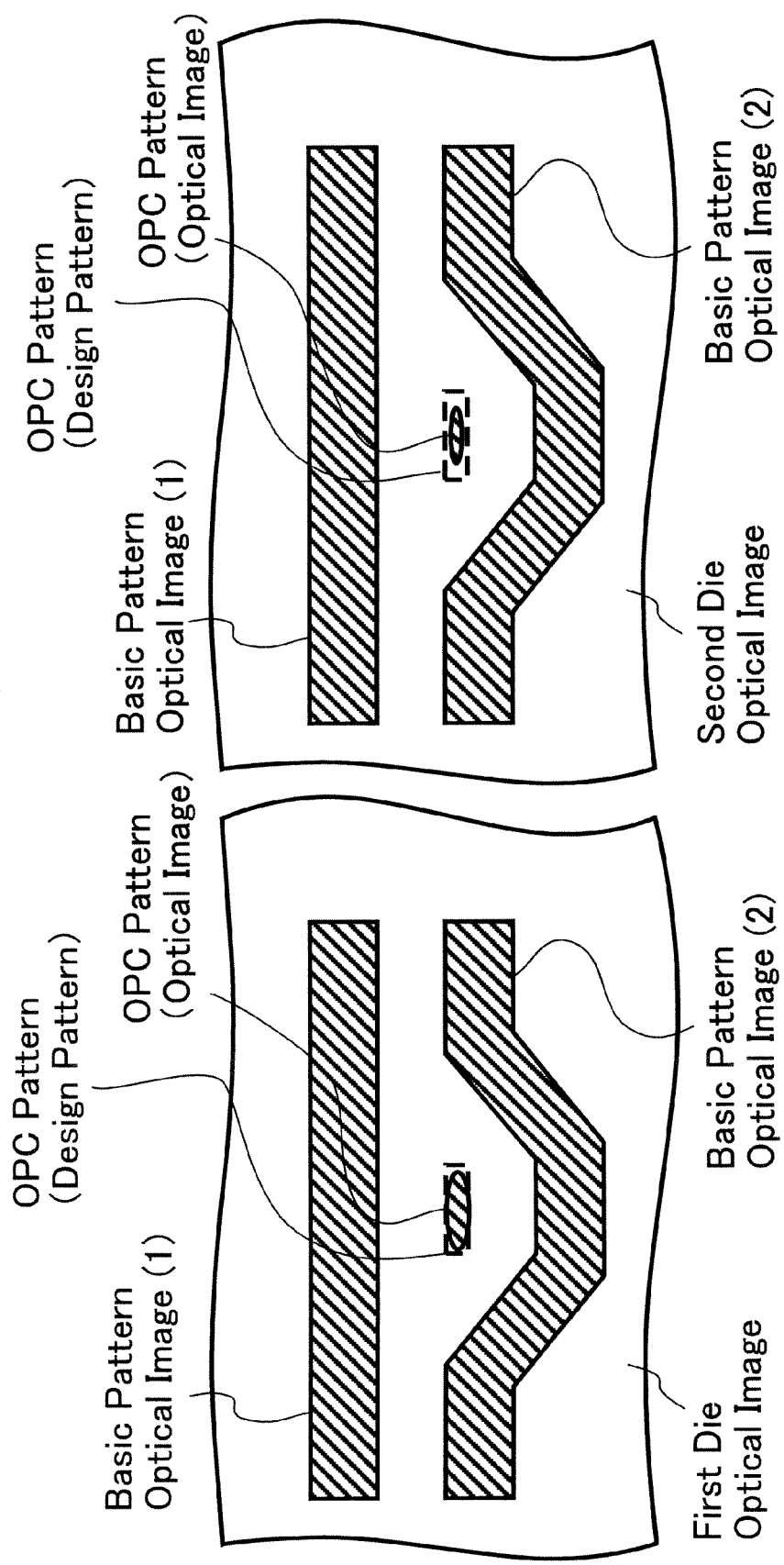
FIG. 9 is a diagram showing the shape of an optical image based on the design pattern in which the OPC pattern shown in FIG. 7 is arranged.

FIG. 9 is a diagram showing the shape of an optical image based on a design pattern in which an OPC pattern shown in FIG. 8 is arranged.

As shown in FIG. 9, when graphic patterns in the design patterns obtained by arranging the OPC patterns shown in FIG. 8 are drawn on a mask serving as a target plate by a drawing device, as in OPC pattern optical images shown in FIG. 9, the OPC patterns are small, and the OPC patterns have different sizes depending on dies (or positions). Therefore, when the optical images of the first and the second dies are compared with each other, the comparison result may be decided as a defect (NG).

As described above, the OPC pattern has pattern lines which are considerably narrower or shorter than those of a pattern mainly used for the target plate as shown in FIG. 8. In addition, the pattern actually drawn on the target plate based on the design pattern, as shown in FIG. 9, is not accurately formed in many cases. When this pattern is inspected by the same comparison threshold value as that of another pattern, an inspection apparatus may recognize the pattern as a defect.

However, it is not significant whether or not the OPC pattern has a high dimensional accuracy. When the pattern is decided as a defect, a large number of pseudo defects are generated on the entire surface of the target plate, and it is difficult to effectively use devices. Therefore, the following region is set.

Figure 10:
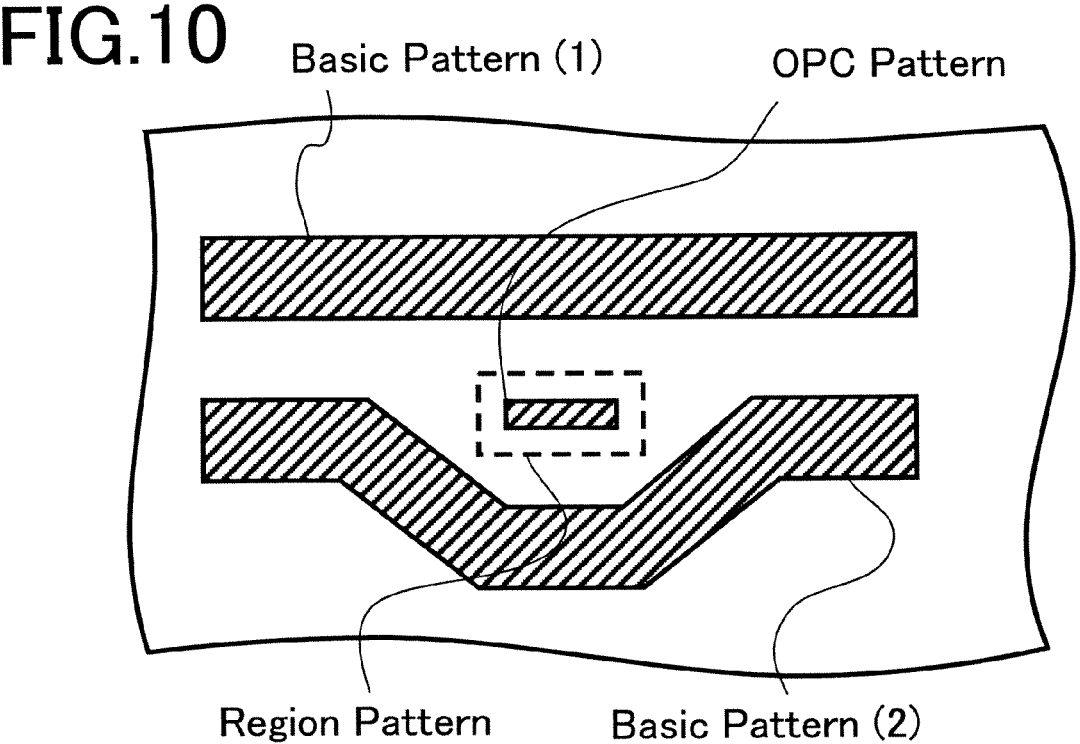
FIG. 10 is a diagram showing an example of a region pattern.

FIG. 10 is a diagram for explaining a region shown by a region pattern.

Figure 11:
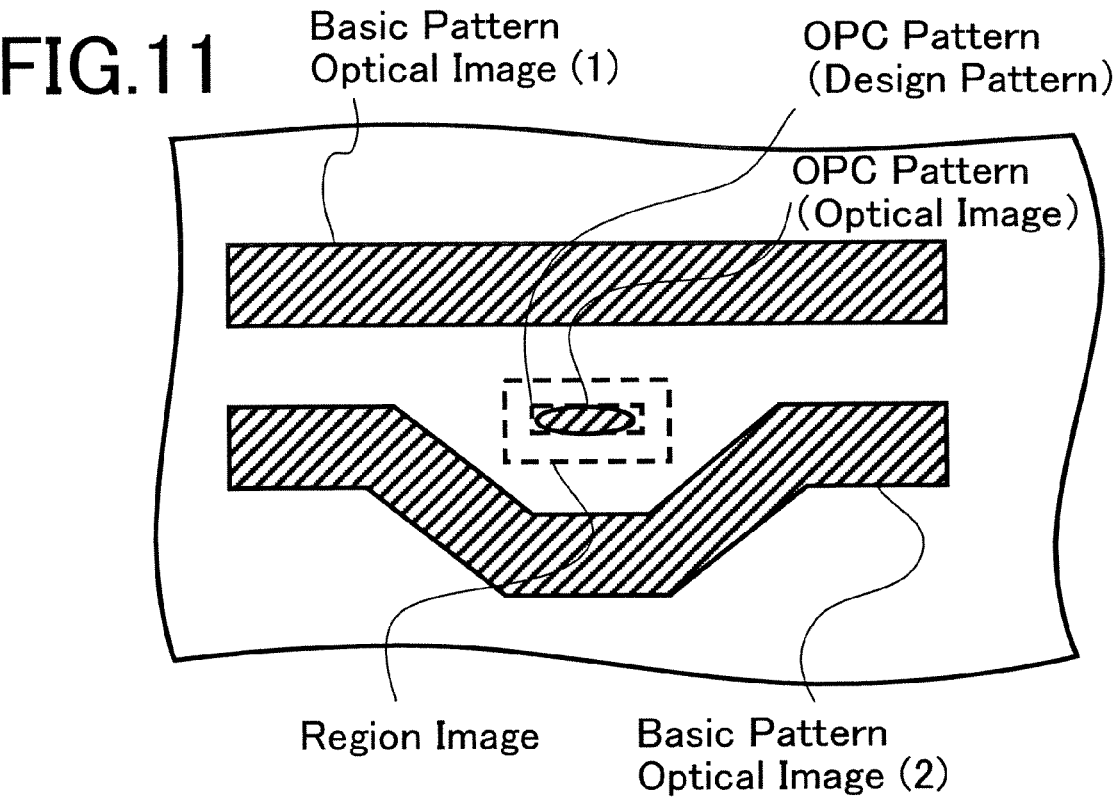
FIG. 11 is a diagram for explaining a region expressed by region image.

As shown in FIG. 10, a region pattern showing a region in which inspection sensitivity need not be severe near an OPC pattern is prepared. The information of the region pattern is converted into region image data by the region information developing circuit 140, and the region image data is input to the comparing circuit 108 shown in FIGS. 2 and 6. As a result, since the comparing circuit 108 can automatically moderate a comparison threshold value of a region corresponding to a region image (two-dimensional graphic pattern derived from a predetermined region pattern and showing a pixel region the inspection decision criterion of which is changed) shown in FIG. 11, a pattern which is decided as a pseudo defect in a conventional technique can be prevented from being decided as a pseudo defect.

As the region pattern, a region having a size slightly larger than that of a portion (in this case, an OPC pattern portion) desired to be designated in consideration of an alignment error is preferably used. For example, a region which is larger than the OPC pattern portion by one pixel in each of all the directions is preferably used.

The region pattern, for example, is directly drawn on a CAD on which a design pattern is drawn. The region pattern may be prepared such that a pattern having a predetermined conversion difference to increase the size of an OPC pattern held by CAD data is automatically generated by program processing. Alternatively, the region pattern may be prepared such that region image data generated from information of a region pattern is subjected to a resizing process to extend the pattern.

As described above, the information of a region pattern formed from the region pattern is prepared, and partial optical image data are compared with each other by using region image data generated by the information of the region pattern to make it possible to reduce pseudo defects in numbers.

Second Embodiment

In the first embodiment, the explanation is given with regard to an OPC pattern. However, a pseudo defect is generated not only in the OPC pattern. Another example, in a second embodiment, inspection of a target plate in which patterns having different design rules (rules of a pattern width and a pattern interval) are formed in the same die will be described below. Since the apparatus configuration of the first embodiment is the same as that of the first embodiment, a description thereof is not repeated. Since the steps of a pattern inspection method are the same as those in the first embodiment except for the points explained below, a description of the same parts are not repeated.

Figure 12:
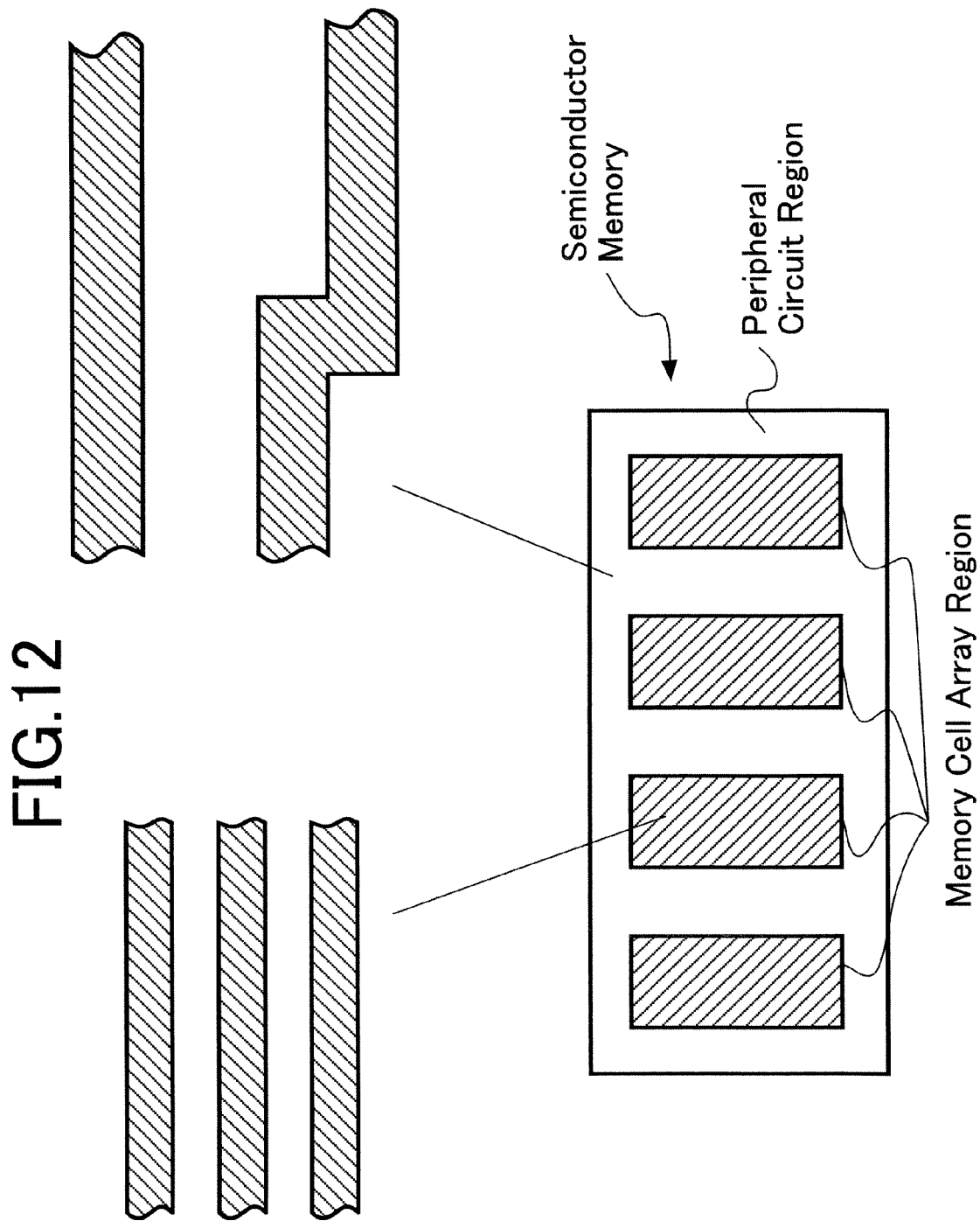
FIG. 12 is a diagram showing an example of a design pattern.

FIG. 12 shows a layout drawing of a semiconductor memory serving as an example of a target plate in which patterns having different design rules are formed in the same die and a design pattern of the semiconductor memory.

As shown in FIG. 12, the semiconductor memory is formed with a memory cell array which stores data and a peripheral circuit which is arranged around the memory cell array and performs logical processing for data or the like. In this case, in order to increase a memory capacity, a dense pattern is required to increase the degree of integration especially in a memory cell array unit. Therefore, the design rule of the memory cell array in general is severer than that of the peripheral circuit.

Figure 13:
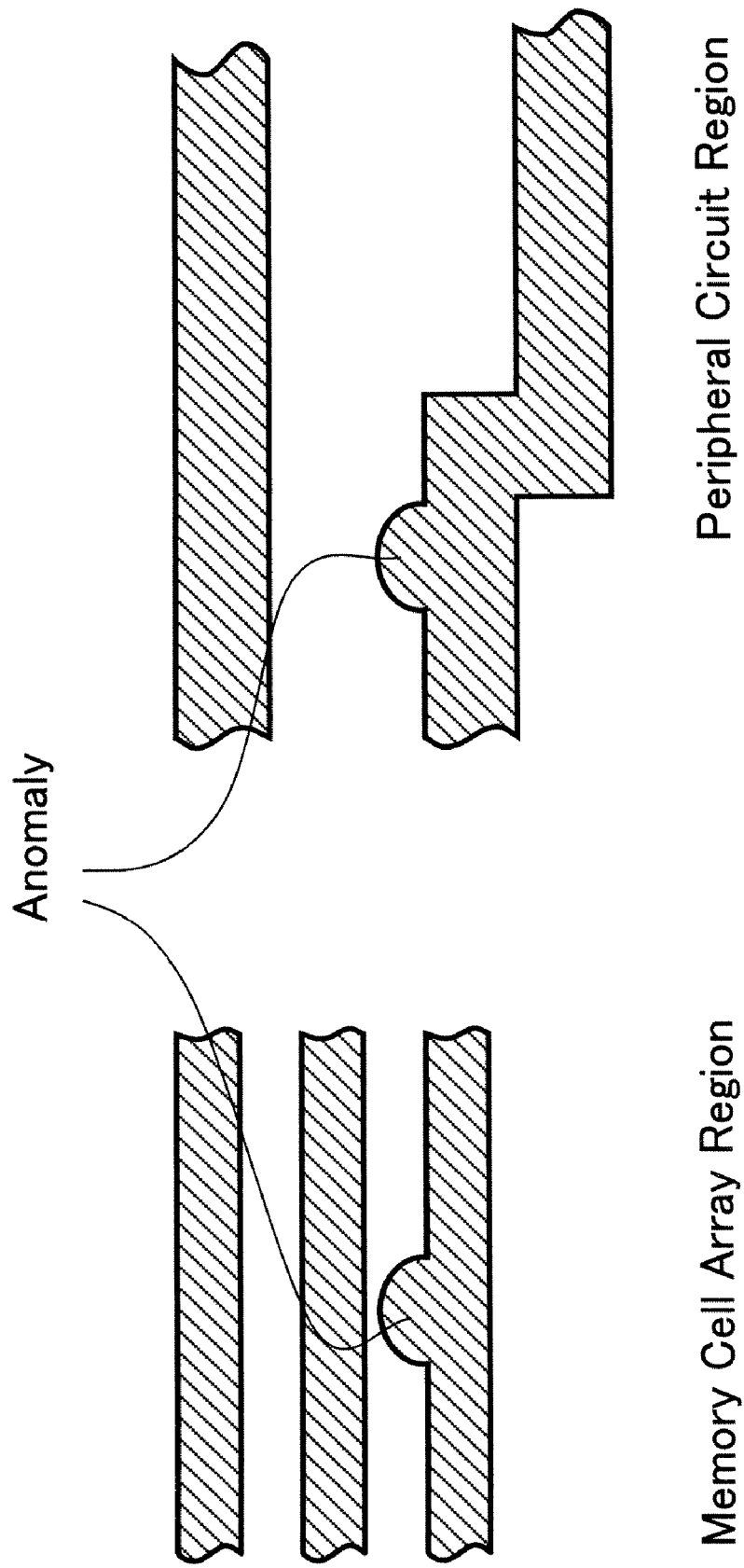
FIG. 13 is a diagram showing an example of an optical image of the pattern in FIG. 12.

FIG. 13 is a diagram showing an example of an optical image of the design pattern in FIG. 12.

As shown in FIG. 13, even if the sizes of anomaly on a mask are equal to each other in the memory cell array unit and the peripheral circuit unit, the design rules of the memory cell array unit and the peripheral circuit unit are different from each other. For this reason, the possibility of short-circuiting the cell array unit becomes high. However, the possibility of short-circuiting the peripheral circuit may be very low.

In such a case, in the memory cell array unit, an inspection threshold value is desired to be severe to avoid the pattern from being short-circuited.

As a matter of course, when a threshold value equal to that of the cell array unit is applied to the peripheral circuit unit, even a anomaly which does not originally cause a short circuit at all is decided as a defect, so that a large number of pseudo defects are generated on the entire surface of the target plate. For this reason, it is difficult to effectively use devices.

Figure 14:
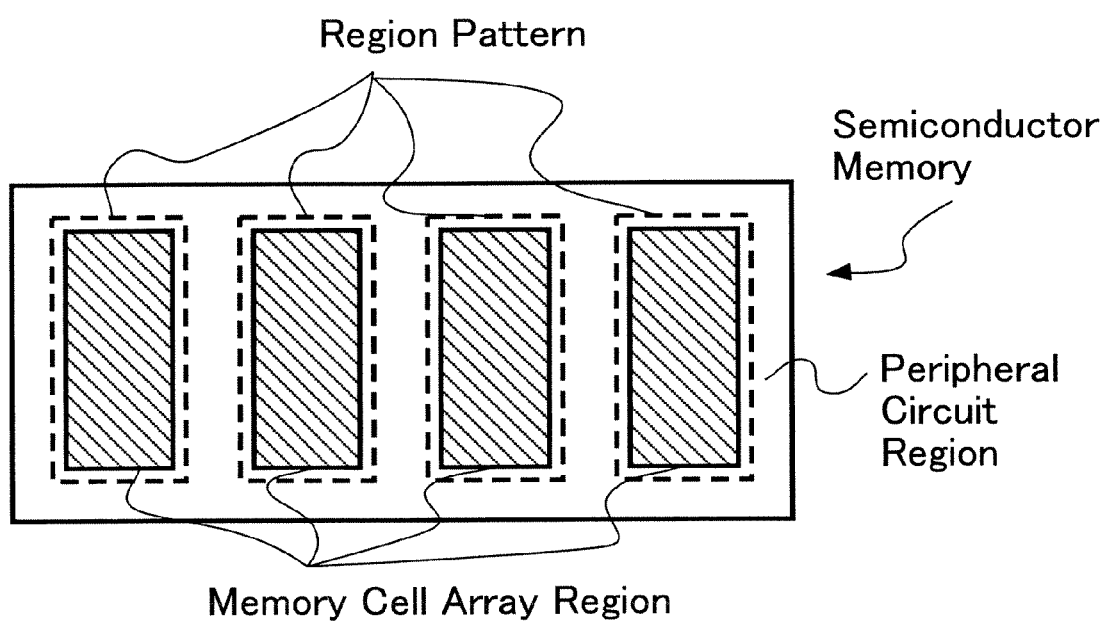
FIG. 14 is a diagram showing an example of a region pattern.

Therefore, as shown in FIG. 14, a region pattern must be formed and prepared in advance in the memory cell array unit to generate region image data representing that the region is the corresponding region, so that the inspection threshold value of the portion can be changed in the comparing circuit 108 such that the inspection threshold value becomes severe. As a result, pseudo defects can be reduced in number.

Alternatively, by forming and preparing information of region pattern in advance so that region image data, which represents that the region is the corresponding region, is generated in the peripheral circuit, an inspection threshold value of the portion can be changed in the comparing circuit 108 such that the inspection threshold value becomes moderate.

An example in which the inspection threshold value is changed with reference to the region image data has been described. However, the region image data can be popularly used in changing the inspection threshold value but also changing the condition for deciding the presence/absence of a defect.

For example, when a target pattern with a micropattern which is not required to be inspected is present on a mask, a region pattern surrounding the region which is not required to be inspected is formed. With reference to region image data based on the region pattern information, the inspection of the region can be omitted, and a pseudo defect caused by the micropattern can be suppressed from being generated.

Alternatively, in deciding the presence/absence of a defect, when an algorithm which refers to pixel information of pixels around a pixel to be inspected is applied to a specific region, the region is surrounded by the region pattern to make it possible to realize a modification of a decision criterion called a defective deciding algorithm.

Third Embodiment

Since an apparatus configuration and respective steps of a pattern inspection method in a third embodiment are the same as those in the first embodiment, a description thereof is not repeated.

The information of a region pattern is preferably present to the entire surface of a region to be inspected. However, it is not good at utilization of devices that the information of a region pattern is needlessly subjected to a developing process for a region the inspection sensitivity is desired to be constant to convert the information into region image data. Therefore, it is also practical that the information of the region pattern is subjected to the developing process for a region in which the large number of OPC patterns described in the first embodiment is present to convert the information into region image data.

Furthermore, in each of the embodiments, the region pattern is either pattern data for a region to be inspected at an inspection threshold value which is severer than that for an ordinary pattern region or pattern data for a region to be inspected at a moderate inspection threshold value.

Fourth Embodiment

Since an apparatus configuration and respective steps of a pattern inspection method in a fourth embodiment are the same as those in the first embodiment, a description thereof is not repeated.

In each of the embodiments described above, in a decision of a defect, only one region image data converted from information of one region pattern is handled as reference data which changes a decision criterion. However, when a plurality of different inspection sensitivities are switched to each other, it can be sufficiently considered or preferable that inspection is performed by using information of a second region pattern serving as second reference data or second and subsequent region image data converted from pieces of information of region patterns of two or more types. In this case, in the comparing circuit 108 (FIGS. 2 and 6), when a plurality of region image data are searched for, with respect to measurement pixel data to be compared and inspected, it can be determined whether region pixel data serving as an information source for checking whether or not an inspection threshold value is changed is present or not. Furthermore, as an arrangement configuration, in FIG. 2, region information developing circuits 140 the number of which is equal to the number of second and subsequent region image data may be additionally arranged.

With respect to measurement pixel data to be compared and inspected, a method that can make processing time shorter than that when the comparing circuit 108 searches for a plurality of region image data will be described below.

Figure 15:
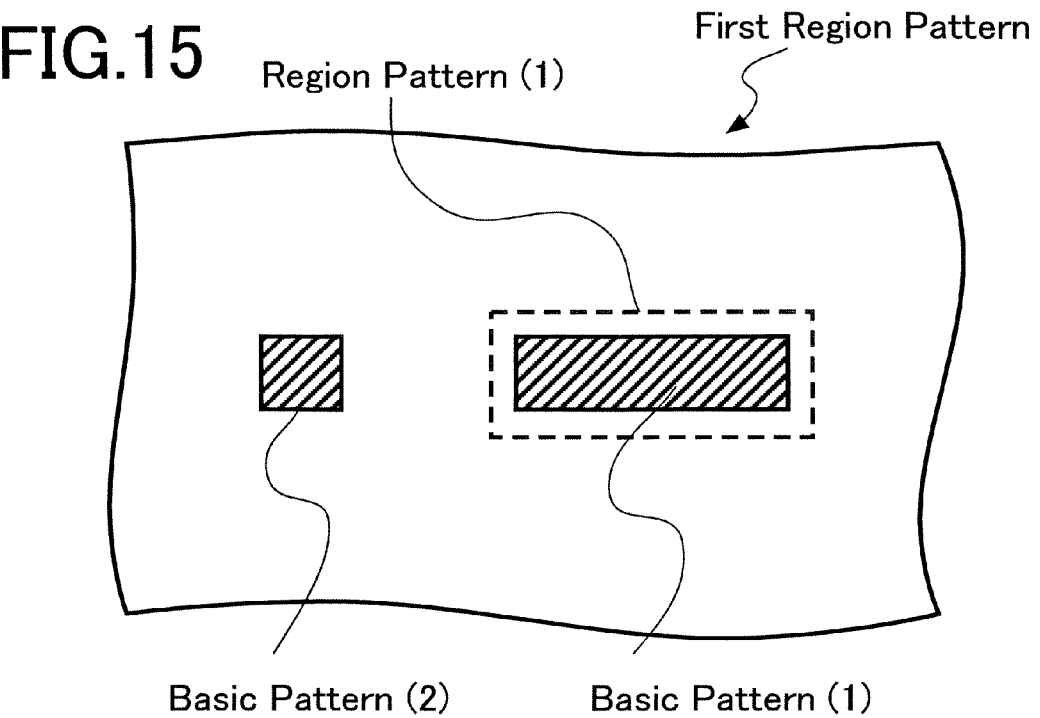
FIG. 15 is a diagram showing an example of a first region pattern.

FIG. 15 is a diagram showing an example of a first region pattern.

Figure 16:
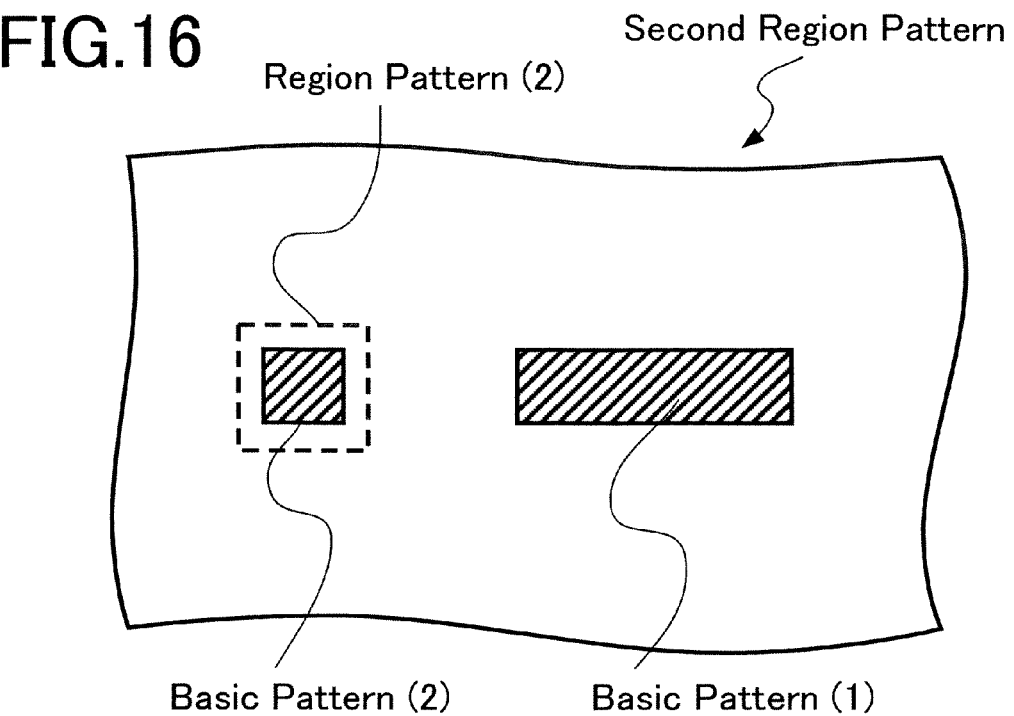
FIG. 16 is a diagram showing an example of a second region pattern.

FIG. 16 is a diagram showing an example of a second region pattern.

Figure 17:
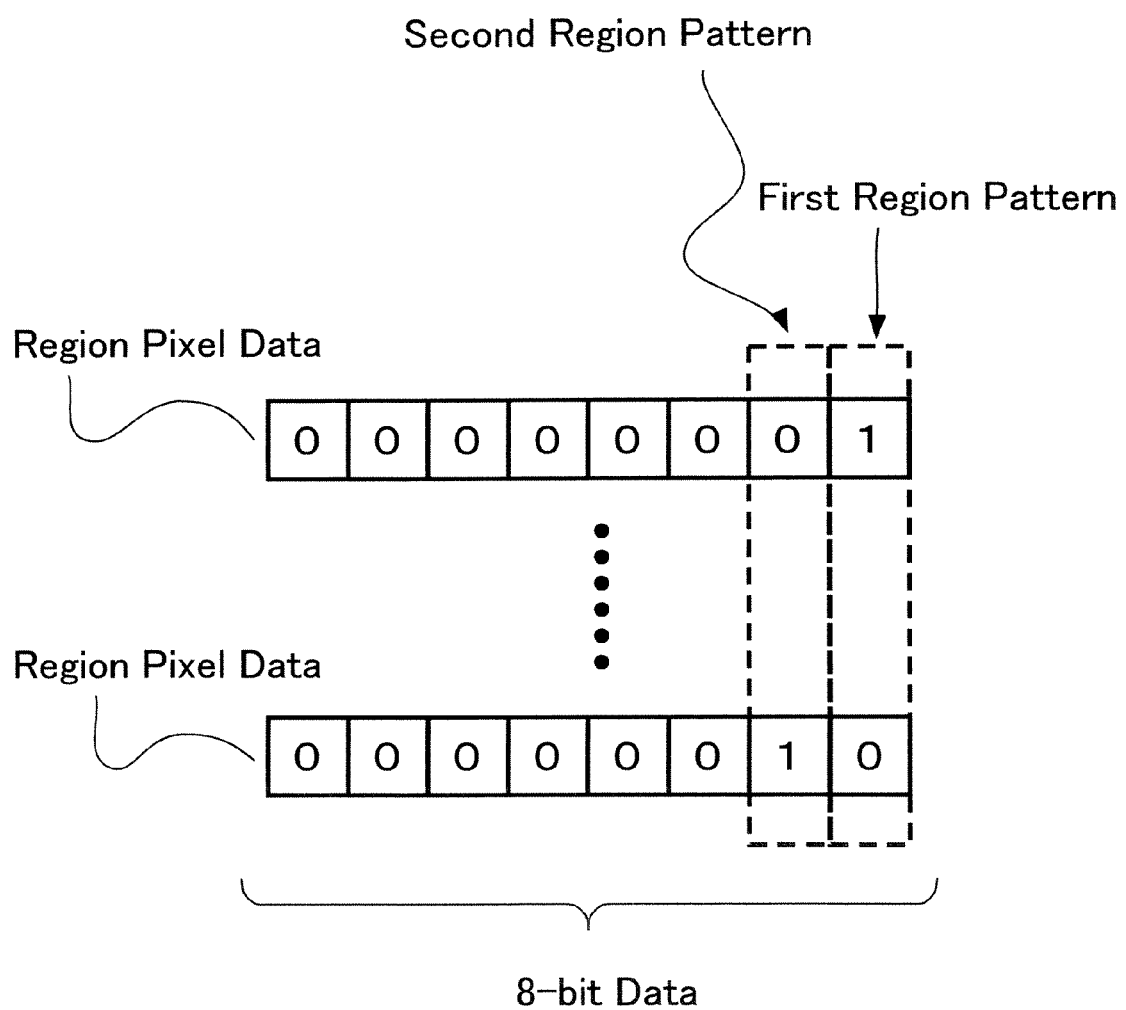
FIG. 17 is a diagram showing an example of region image data.

FIG. 17 is a diagram showing an example of region image data.

When a basic pattern (1) and a basic pattern (2) are arranged as design patterns, in FIG. 15, as a first region pattern, a region near the basic pattern (1) is set to be inspected at a certain inspection threshold value. In FIG. 16, as a second region pattern, a region near the basic pattern (2) is set to be inspected at another inspection threshold value. In such a case, when the region information developing circuit 140 develops the region information into region pixels in units of bits, as shown in FIG. 17, region image data is expressed as n-bit pixel data in each region pixel (in this case, 8-bit data is expressed as an example). In a region pixel expressing the first region pattern, conversion is performed such that "1" is set in the first bit. In a region pixel of a region expressing the second region pattern, conversion is performed such that "1" is set in the second bit. With this configuration, even though a plurality of region patterns are used, only one region image data is enough without using a plurality of region image data. As a result, the comparing circuit 108 searches for one region image data, so that, of a plurality of inspection threshold values related to pixels to be compared and inspected, a specific threshold value into which a given threshold value is changed can be determined.

When the method is used, it is preferable that an increase in scale of the apparatus and restriction of inspection time are considered.

Fifth Embodiment

Since an apparatus configuration in a fifth embodiment is the same as that in the first embodiment, a description thereof is not repeated. Respective steps of a pattern inspection method are same as those of the first embodiment except for the parts explained below; therefore, the same parts are not explained again.

In a process of generating region image data, region image data is always generated and input to a comparing circuit 108 to make it possible to stabilize inspection time. However, it is rare that region image data is required on the entire surface of a target plate. Therefore, in order to prevent the apparatus from being increased in size, in the flow chart in FIG. 7, it is practical to generate region image data to a portion at which a defective candidate appears in comparison between partial optical image data. In other words, the region image data is preferably generated when a difference obtained as a result of comparison between measurement pixel data of partial optical image data in the comparing circuit 108 exceeds a predetermined threshold value. In the comparing step (2) of S228, the threshold value is changed into the threshold value expressed by the region image data, so that the measurement pixel data are compared with each other again.

As described above, region image data is generated to a portion at which a defective candidate appears, so that pseudo defects which are decided in a conventional technique can be reduced in number while shortening processing time. Therefore, devices can be effectively used such that inspection is prevented from being performed again.

Sixth Embodiment

In a sixth embodiment, since an apparatus configuration and the steps of a pattern inspection method are the same as those in the first embodiment, a description thereof will not be repeated.

The size of one pixel of region image data (region pixel) is basically made equal to the size of one pixel of optical image data (measurement pixel). When it is known that the size of a region in which an inspection threshold value is changed is a certain size or more, the size of one pixel in the region image data is preferably made larger than the size of one pixel in the optical image data without making the size of one pixel in the optical image data equal to the size of one pixel in the region image data.

Figure 18:
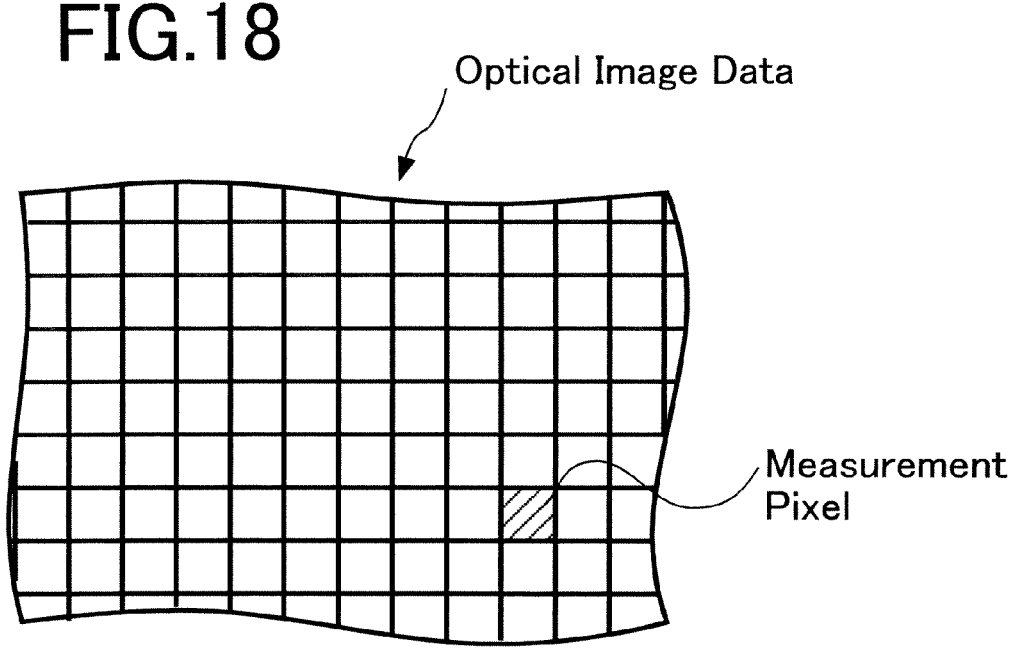
FIG. 18 is a diagram showing an example of a measurement pixel in optical image data.

FIG. 18 is a diagram showing an example of a measurement pixel in the optical image data.

Figure 19:
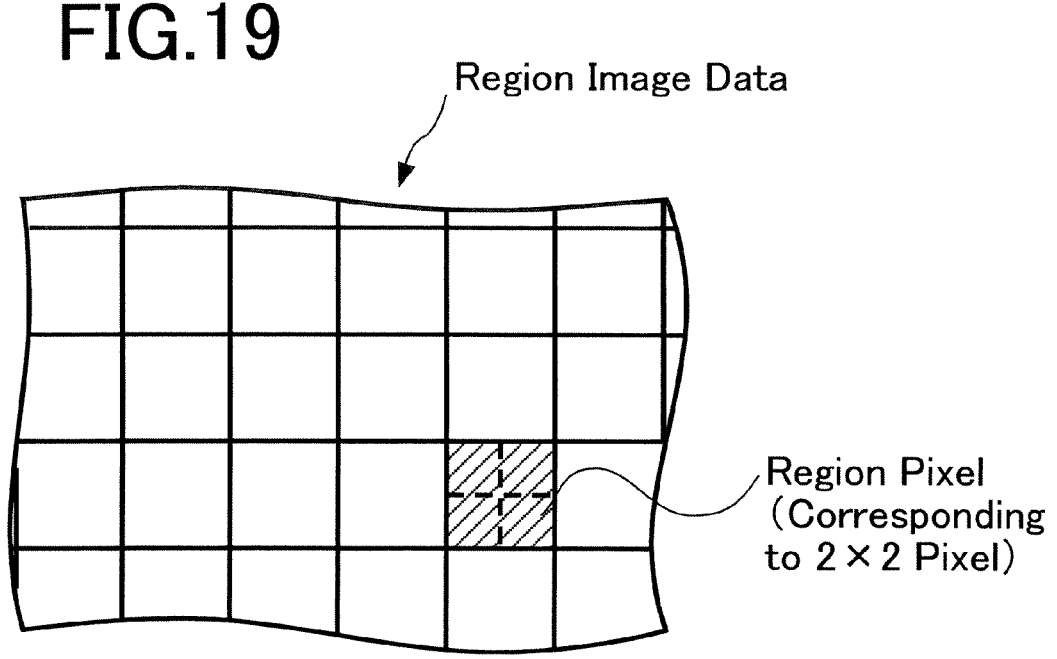
FIG. 19 is a diagram showing an example of a region pixel in region image data.

FIG. 19 is a diagram showing an example of a region pixel in the region image data.

When the pixel region in the optical image data is divided into grids each having a predetermined quantization size as a unit, the pixel region in the region image data is virtually divided into grids each having a size larger than the quantization size of the measurement pixel data as shown in FIG. 19 as a unit. The region image data is generated as data of a grid having a size larger than the size of the optical image data as a unit. For example, in FIG. 19, an operation which makes the size of 2×2 pixels of the optical image data equal to the size of one pixel of the region image data is performed to make it possible to reduce the number of pixels of the region image data. Therefore, the data amount of the information of the region pattern can also be reduced, and processing time required for conversion into the region image data can be practically shortened.

As described above, by utilizing region image data converted from information of region pattern which represents a predetermined region of a target plate to be inspected, the number of anomaly which are conventionally determined as pseudo defects can be reduced, and the apparatus can be advantageously used such that a repetition of the inspection can be avoided.

Figure 20:
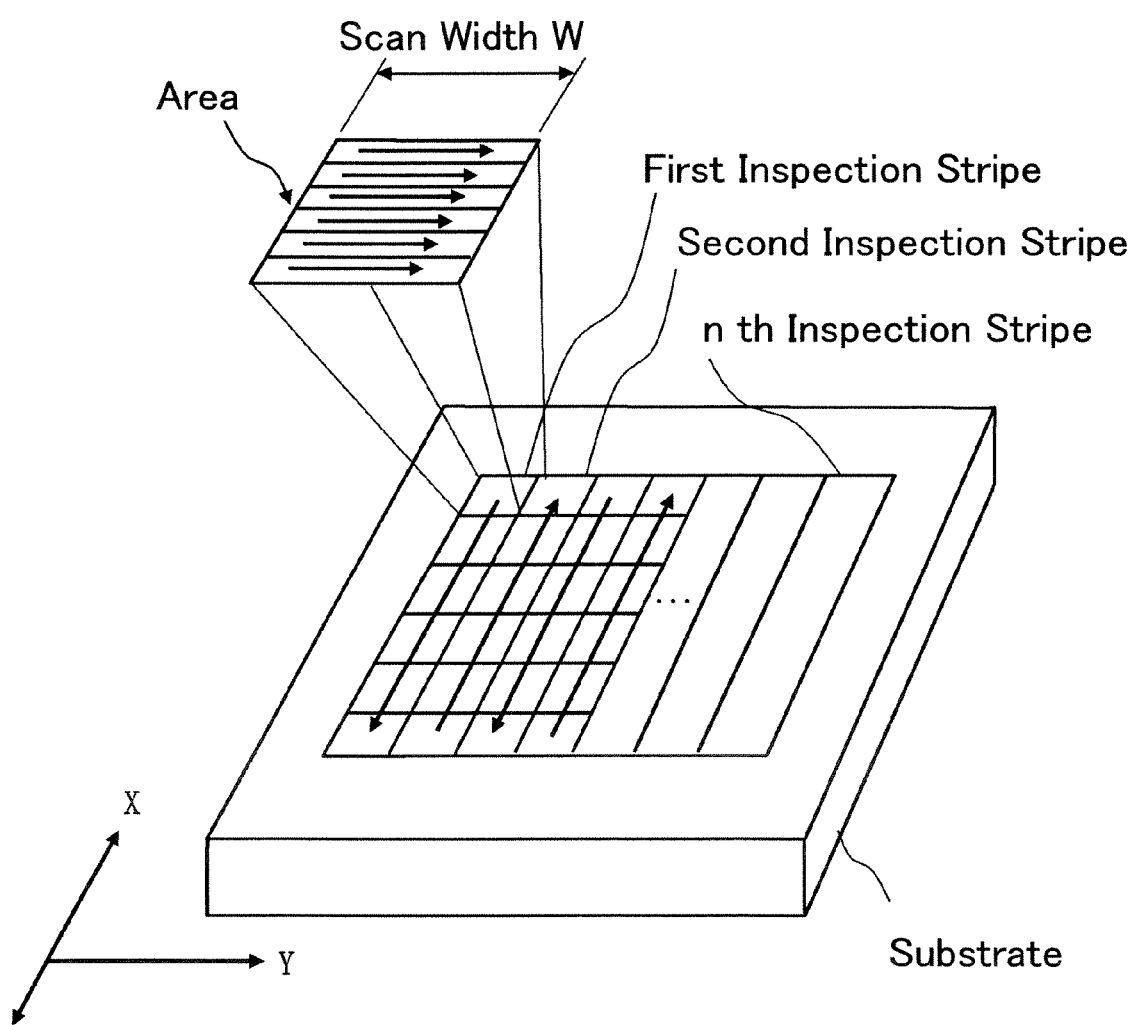
FIG. 20 is a diagram for explaining another optical image acquiring method.

FIG. 20 is a diagram for explaining another optical image acquisition method.

In the configuration in FIG. 2, the photodiode array 105 which simultaneously receives the data the number of which is the number of pixels (for example, 2048 pixels) of a scan width W is used. However, the optical image acquisition method is not limited to using the photodiode array 105. As shown in FIG. 20, the following method may be used. That is, while the XYθ table 102 is slid at a constant rate in an X direction, a laser beam scans by a laser scanning optical device (not shown) in a Y direction each time movement of a predetermined pitch is detected by a laser interferometer, and transmitted light is detected to acquire a two-dimensional image every area having a predetermined size.

In the above explanation, the various circuits and the various steps described above can be constituted by programs which can be operated by a computer. Alternatively, the circuits and the steps may be realized not only by programs serving as software but also by a combination of hardware and software. Alternatively, a combination of software and firmware may be used. When the circuits and the steps are constituted by programs, the programs are recorded on a recording medium such as a magnetic disk device, a magnetic tape device, an FD, or a ROM (Read Only Memory). For example, the table control circuit 114, the region information developing circuit 140, the comparing circuit 108, and the like may be constituted by electric circuits or the like or may also be realized as software processed by the control computer 110. These circuits may also be realized by combinations of electric circuits and software.

The embodiments have been described with reference to the concrete examples. However, the present invention is not limited to the concrete examples.

For example, although, in each of the embodiments, transmitted light is used, the pattern inspection apparatus is not limited to a transmissive inspecting apparatus which detects and measures transmitted light from a target plate. More specifically, any apparatus using measurement pixel data as an optical image, i.e., a reflective defect inspecting apparatus which detects and measures reflected light from a target plate or a defect inspecting apparatus which simultaneously use transmitted light and reflected light may be used.

In each of the embodiments, patterns in different dies are compared with each other. However, with respect to partial optical image data to be compared with each other, patterns in different dies are not necessarily compared with each other, and same patterns at different positions on the same die may be compared with each other. For example, memory cell arrays of same patterns which are repeatedly arranged may be compared with each other, or core circuits such as a sense amplifier and a decoder which are arranged in each of memory cell arrays may be compared with each other.

The pattern inspection apparatus is not limited to a defect inspecting apparatus for a mask. The pattern inspection apparatus may be a defect inspecting apparatus for a wafer surface.

Furthermore, the region information developing circuit 140 for the information of a region pattern is not necessarily arranged in the inspecting apparatus. The region information developing circuit 140 may be arranged out of the inspecting apparatus such that region image data converted from the information of the region pattern is input to the inspecting apparatus.

In the apparatus configurations, the control methods, and the like, parts or the like which are not directly required to explain the present invention are not described. However, a necessary apparatus configuration and a necessary control method can be appropriately selected and used.

All pattern inspection apparatuses and all pattern inspection methods or programs which have the constituent elements of the present invention and which can be appropriately changed in design by a person skilled in the art are included in the spirit and scope of the invention.

What is claimed is:

1. A pattern inspection apparatus which compares a plurality of partial optical image data of a same target plate to be inspected, the target plate being formed as a pattern, comprising:
    an optical image data acquiring unit configured to acquire optical image data of the target plate to be inspected; and
    a comparing unit configured to receive region image data generated based on information of a region pattern, wherein the information of the region pattern is input to the pattern inspection apparatus and represents a predetermined region of the target plate to be inspected, to change a decision criterion with reference to the region image data, and to compare the plurality of partial optical image data against each other,
    wherein the information of the region pattern includes, as a format, a coordinate (x, y), a length of side, and a graphic code serving as identifier which discriminates graphic type, and the region image data is generated using the coordinates (x, y), the length of side, and the graphic code.

2. The pattern inspection apparatus according to claim 1, further comprising a region image data generating unit configured to generate region image data based on the information of the region pattern.

3. The pattern inspection apparatus according to claim 1, wherein the optical image data is generated as data of a grid having a predetermined size as a unit, and the region image data is generated as data of a grid having a size larger than the predetermined size as a unit.

4. A pattern inspection apparatus which compares a plurality of partial optical image data of a same target plate to be inspected, the target plate being formed as a pattern, comprising:

an optical image data acquiring unit configured to acquire optical image data of the target plate to be inspected; and a comparing unit configured to receive region image data generated based on information of a region pattern, wherein the information of the region pattern is input to the pattern inspection apparatus and represents a predetermined region of the target plate to be inspected, to change a decision criterion with reference to the region image data when a predetermined decision criterion is not satisfied as a result of comparison between the plurality of partial optical image data, and to compare the plurality of partial optical image data against each others, wherein the information of the region pattern includes, as a format, a coordinate (x, y), a length of side, and a graphic code serving as identifier which discriminates graphic type, and the region image data is generated using the coordinates (x, y), the length of side, and the graphic code.

5. The pattern inspection apparatus according to claim 4, further comprising a region image data generating unit configured to generate region image data based on the information of the region pattern.

6. The pattern inspection apparatus according to claim 4, wherein the region image data is generated when a predetermined decision criterion is not satisfied as a result of comparison between the plurality of partial optical image data in the comparing unit.

7. The pattern inspection apparatus according to claim 4, wherein the optical image data is generated as data of a grid having a predetermined size as a unit, and the region image data is generated as data of a grid having a size larger than the predetermined size as a unit.

* * * * *